US005545278A

United States Patent [19]

Chen et al.

[11] Patent Number: 5,545,278

[45] Date of Patent: * Aug. 13, 1996

[54] METHOD FOR INCREASING FIBER STRENGTH TRANSLATION IN COMPOSITION PRESSURE VESSELS USING MATRIX RESIN FORMULATIONS CONTAINING ANHYDRIDE CURING AGENTS AND SURFACE-ACTIVE AGENTS

[75] Inventors: Cheng-Chi Chen, Arlington, Tex.; Ben A. Lloyd, Brigham City, Utah; Neal A. Mumford, Brigham City, Utah; Rolf M. Johns, Brigham City, Utah

[73] Assignee: Thiokol Corporation, Ogden, Utah

[ * ] Notice: The term of this patent shall not extend beyond the expiration date of Pat. No. 5,356,499.

[21] Appl. No.: 198,615

[22] Filed: Feb. 18, 1994

Related U.S. Application Data

[63] Continuation-in-part of Ser. No. 81,839, Jun. 23, 1993, Pat. No. 5,356,499, which is a continuation of Ser. No. 426,890, Oct. 25, 1989, abandoned.

[51] Int. Cl.⁶ ............................................. B65H 81/00
[52] U.S. Cl. ............................................. 156/175
[58] Field of Search ........................... 156/175, 275.5, 156/330; 428/36.3; 242/7.01

[56] References Cited

U.S. PATENT DOCUMENTS

| | | | |
|---|---|---|---|
| 2,824,083 | 2/1958 | Parry et al. | 260/47 |
| 2,904,530 | 9/1959 | Steckler et al. | 260/47 |
| 2,909,494 | 10/1959 | Parry et al. | 260/18 |
| 3,317,470 | 5/1967 | Cofer | 260/47 |
| 3,403,199 | 9/1968 | Ramos | 260/830 |
| 3,454,421 | 7/1969 | Westbrook | 117/126 |
| 3,488,404 | 1/1970 | Parker, Jr. | 260/830 |
| 3,546,169 | 12/1970 | Cole | 260/47 |
| 3,647,702 | 3/1972 | Cole | 252/182 |
| 3,725,502 | 4/1973 | Bernheim et al. | 260/830 TW |
| 3,728,302 | 4/1973 | Helm | 260/37 EP |
| 3,784,647 | 1/1974 | Fleming et al. | 260/830 |
| 3,829,354 | 8/1974 | Bertram et al. | 161/88 |
| 3,914,204 | 10/1975 | Helm et al. | 260/47 EN |
| 3,919,386 | 11/1975 | Segal | 264/255 |
| 3,983,289 | 9/1976 | Nishizaki et al. | 428/268 |
| 4,088,633 | 5/1978 | Gurney | 260/47 EN |
| 4,092,443 | 5/1978 | Green | 427/53 |
| 4,117,361 | 9/1978 | Smith et al. | 310/208 |
| 4,197,389 | 4/1980 | Becker et al. | 528/103 |
| 4,262,109 | 4/1981 | Englin et al. | 528/104 |
| 4,330,659 | 5/1982 | King et al. | 528/99 |
| 4,340,713 | 7/1982 | Davis et al. | 528/89 |
| 4,366,108 | 12/1982 | Urech et al. | 264/137 |
| 4,421,806 | 12/1983 | Marks et al. | 428/36 |
| 4,447,586 | 5/1984 | Shimp | 525/504 |
| 4,479,984 | 12/1982 | Levy et al. | 427/54.1 |
| 4,481,349 | 11/1984 | Marten et al. | 528/120 |
| 4,487,948 | 12/1984 | Shimp et al. | 549/552 |
| 4,521,583 | 6/1985 | Kohli | 528/119 |
| 4,601,769 | 7/1986 | DeHoff | 156/169 |
| 4,607,069 | 8/1986 | Tesch et al. | 523/400 |
| 4,624,885 | 11/1986 | Mumford et al. | 428/222 |
| 4,652,492 | 3/1987 | Seiner et al. | 428/414 |
| 4,668,758 | 5/1987 | Corley | 528/91 |
| 4,683,282 | 7/1987 | Goel | 528/91 |
| 4,683,284 | 7/1987 | Goel | 528/93 |
| 4,701,378 | 10/1987 | Bagga et al. | 428/414 |
| 4,767,017 | 8/1988 | Logullo, Sr. et al. | 220/3 |
| 4,775,736 | 10/1988 | Wiggins | 528/91 |
| 4,798,761 | 1/1989 | Wykowski et al. | 428/272 |
| 4,892,764 | 1/1990 | Drain et al. | 428/34.5 |
| 4,956,411 | 9/1990 | Tada et al. | 528/93 |
| 4,977,214 | 12/1990 | Bagga | 525/109 |
| 4,985,530 | 1/1991 | Murakami et al. | 528/103 |
| 5,011,721 | 4/1991 | Decker et al. | 428/36.9 |
| 5,017,674 | 5/1991 | Tada et al. | 528/93 |
| 5,025,078 | 6/1991 | Lucas et al. | 528/120 |
| 5,049,639 | 9/1991 | Storey et al. | 528/120 |
| 5,053,475 | 10/1991 | Tada et al. | 528/98 |
| 5,061,779 | 10/1991 | Wang | 528/98 |
| 5,091,474 | 2/1992 | Murakami et al. | 525/109 |
| 5,227,452 | 7/1993 | Earls et al. | 528/96 |
| 5,296,570 | 3/1994 | Earls et al. | 525/481 |
| 5,310,770 | 5/1994 | DeGooyer et al. | 523/414 |
| 5,556,499 | 12/1994 | Decker et al. | 156/175 |

FOREIGN PATENT DOCUMENTS 7817298  6/1978  France ........................... B32B 31/12

OTHER PUBLICATIONS

"Enhanced Bonding Of Fiber Reinforcements To Thermoset Resins", G. Sugerman, S. J. Monte, S. M. Gabayson, and W. E. Whitwood, 20th International SAMPE Technical Conference, Sep. 27–29, 1988, pp. 423–437.

"Standard Method for Preparation and Tension Testing of Filament–Wound Pressure Vessels", ASTM Designation D 2585–68 (Reapproved 1985), pp. 23–29.

"Standard Method for Preparation and Tension Testing of Filament–Wound Pressure Vessels", ASTM Designation D 2585–68 (Reapproved 1974), pp. 453–459.

*Primary Examiner*—Christopher W. Raimund
*Attorney, Agent, or Firm*—Madson & Metcalf; Ronald L. Lyons

[57] ABSTRACT

Composite pressure vessels having improved fiber strength translation of the unidirectional, axial, impregnated strand are obtained by a process in which chemorheologically viscosity tailored matrix resin formulations containing surface-active agents or compounds acting as surface-active agents are employed. The use of chemorheologically viscosity tailored matrix resin formulations containing surface-active agents reduces the strength variation of pressure vessels produced from prepregs of the disclosed matrix resin formulations.

14 Claims, No Drawings

METHOD FOR INCREASING FIBER STRENGTH TRANSLATION IN COMPOSITION PRESSURE VESSELS USING MATRIX RESIN FORMULATIONS CONTAINING ANHYDRIDE CURING AGENTS AND SURFACE-ACTIVE AGENTS

RELATED APPLICATION

This application is a continuation-in-part of application Ser. No. 08/081,839, filed Jun. 23, 1993, entitled "Method For Increasing Fiber Strength Translation In Composite Pressure Vessels Using Matrix Resin Formulations Containing Surface Active Agents" now U.S. Pat. No. 5,356,499, which is a continuation of application Ser. No. 07/426,890, filed Oct. 25, 1989, now abandoned, both of which are incorporated herein by this reference.

BACKGROUND OF THE INVENTION

1. The Field of the Invention

This invention relates to a method for making composite pressure vessels of improved delivered tensile strength. The invention further relates to the use of surface-active agents, surfactants or compounds acting as surface-active agents to improve the fiber strength translation in composite pressure vessels and to improve prepreg uniformity by reducing the variation in strength of the composite pressure vessels.

2. Technical Background

Solid propellant rocket motor cases for missile systems, spacecraft boosters and other types of large and small high performance, lightweight pressure vessels are commonly made from fiber reinforcement and various formulations of polyepoxide resins (epoxy resins) by a filament winding process. Similarly, filament winding with both polyesters and epoxy resins has made possible production of lightweight tanks, poles, piping and the like. Historically, fiberglass has been the most common reinforcement fiber. Recently other fibers such as carbon filaments, boron filaments, and high modulus organic polymer filaments, most significantly aramid filaments, have become increasingly useful in these composite structures to take advantage of their differing and sometimes unique physical properties.

The resins utilized are typically epoxy formulations based on diglycidyl ether-bisphenol A (DGEBA), reactive low molecular weight epoxy diluents, and curing agents such as aliphatic and aromatic amines and carboxylic acid anhydrides. Both flexibilized and rigid epoxy resins have been used as matrix resins for filament wound composite structures.

In providing composite articles, such as pressure vessels, either wet winding or prepreg processes have been employed. In wet winding process, the fiber is run through a resin bath containing the resin composition whereby the fiber is coated with the composition. The resulting resin-fiber combination is then wound directly into the desired structure. The structures are then cured by polymerization initiated by heat or radiation. On the other hand, if a prepreg is to be used, the fiber or "tape" is impregnated with a curable resin composition and then wound on a spool. This prepreg is stored for winding at a future time. When the prepreg is converted into a composite article, the prepreg is typically cured by polymerization initiated by heat or radiation.

One drawback encountered in the production of composite pressure vessels has been the reduction in pressure vessel tensile strength compared to the unidirectional, axial impregnated tow tensile strength. A common measure of performance in composite pressure vessels is fiber strength translation of such tow strength to delivered tensile strength of the hoop fibers of the composite pressure vessel. Improved fiber strength translation of even a few percent is significant and valuable since fiber strength translation directly effects the design, weight, strength and cost of such pressure vessels. Thus, a highly desirable object would be to increase the tow or fiber strength translation into delivered tensile strength of hoop fibers of composite pressure vessels expressed as a percent of the tow strength.

A further drawback resides in the variation of the material from which the composite pressure vessels are produced. For pressure vessels the material strength used in designing (or design allowable strength) is the average strength of the test pressure vessels less three times the standard deviation (or coefficient of variation when expressed as a percent). For example, if the average strength is 90% of the tow strength and the standard deviation is 3%, the design allowable strength is 82% of the tow strength (i.e., 90(100-3(3))/100= 82%). Historical precedent suggests that composite pressure vessels fabricated by wet-winding have standard deviations of about 4 to 8% while pressure vessels fabricated from prepregs have standard deviations of approximately 2–4%. It would therefore be highly desirable to provide matrix resin formulations and methods capable of significantly reducing the standard deviations to below these values.

Such resin formulations and methods are disclosed and claimed herein.

SUMMARY OF THE INVENTION

Composite pressure vessels having improved fiber strength translation into delivered tensile strength of hoop fibers are obtained using a process in which matrix resin formulations contain surface-active agents or compounds acting as surface-active agents. As used herein, the term surface-active agent is inclusive of both surface-active agent and compounds acting as surface-active agents. The matrix resin formulations are based upon chemorheologically viscosity tailored matrix resins. The use of chemorheologically viscosity tailored matrix resin formulations containing surface-active agents also reduces the strength variation of pressure vessels produced from such resin formulations.

As used herein, the term chemorheologically viscosity tailored matrix refers to a matrix resin formulation in which the material processing viscosity is controlled by chemical formulation (chemorheologically tailoring) rather than by the use of solvents or heated impregnation equipment. The matrix resin formulation contains both a reactive curing agent and a latent curing agent. The reactive curing agent is one which is reactive (either alone or in the presence of a catalyst) at room temperature. The reactive curing agent functions as a viscosity builder to raise the viscosity of the matrix resin formulation after impregnation on a fiber to a plateau viscosity greater than about 50,000 cps. This produces a long-working-life prepreg composition whose handling properties do not change significantly over at least about thirty days or more at room temperature.

The reactive curing agent includes an anhydride functional group. It has been found that the use of an anhydride reactive curing agent permits the chemorheologically viscosity tailored matrix resin formulations to have a long impregnation pot-life with a quick viscosity build-up. A wide range of plateau viscosities is available using anhydride reactive curing agents in various amounts.

The latent curing agent in the matrix resin formulation is relatively unreactive at room temperature, but causes rapid curing of the matrix when heated or radiated. The latent curing agent is sufficiently unreactive that the matrix resin formulation will, upon heating, allow the viscosity of the prepreg composition to decrease sufficiently to cause the resin to flow. This eliminates voids during winding and formation of a wound composite article. The viscosity is not so low, however, as to cause excessive resin bleed from the composite article, i.e. generally to a viscosity of from about 500 to about 500,000 cps. This provides for good knitting between plies of the wound prepreg strands, plies of tape, or plies of fabric and combinations thereof. The viscosity of the matrix material increases to the resin gelling or setting state, (i.e. becoming fully cured as a cured composite article), during the thermal cure sequence typically employed in filament winding of composite articles.

DETAILED DESCRIPTION OF THE PREFERRED EMBODIMENTS

Improved fiber strength translation and reduction in the strength variation in composite pressure vessels is obtained according to this invention. Composite pressure vessels are prepared from chemorheologically viscosity tailored matrix resin-fiber prepregs in which the matrix resin formulation has present an effective amount of a surface-active agent or compound acting as a surface-active agent. Especially preferred chemorheologically viscosity tailored matrix resin formulations are disclosed in U.S. Pat. No. 5,011,721 to Decker, issued Apr. 30, 1991, which is incorporated herein by reference.

Such chemorheologically viscosity tailored resin formulations are those which comprise a curable matrix resin and an effective amount of a reactive resin curing agent reactive at room temperature and a latent resin curing agent substantially nonreactive at room temperature but activated upon heating or radiation. The reactive curing agent includes an anhydride functional group.

The matrix resin formulation has a viscosity sufficiently low enough to enable the matrix resin to impregnate fibers at room temperature. The viscosity of the matrix resin increases, upon standing at room temperature, due primarily to the action of the reactive curing agent, until the viscosity plateaus.

The plateau viscosity is high enough to prevent bleeding of matrix resin from the prepreg due to winding tension, yet low enough to allow tack and drape in the prepreg so that it nestles and seats during its subsequent use in winding a composite article. The plateau viscosity is preferably greater than 50,000 cps, and usually from about 50,000 cps to about 800,000 cps, although in some cases very high plateau viscosities (>800,000) may be preferred.

The matrix resin in the prepreg experiences a reduction in viscosity upon heating the prepreg composition, to allow the matrix resin to flow and substantially eliminate formation of voids in the winding of a composite article. With the continued application of heat or radiation to the composite article, the matrix resin cures to a hardened or gelled state.

As examples of such preferred chemorheologically viscosity tailored matrix resin formulations to which a surface-active agent of this invention may be added are those containing an epoxy resin based on a glycidyl ethers or esters and aliphatic epoxides. A reactive curing agent is included, selected from aliphatic, cycloaliphatic, and aromatic anhydrides such as, for example, nadic methyl anhydride, methyltetrahydrophthalic anhydride, methylhexahydrophthalic anhydride and maleic anhydride, mixtures of anhydrides, and the like. A latent hardener is added and may be selected from a blocked Lewis acid such as boron trifluoride monoethylamine, or tertiary amines, and the like and mixtures thereof.

An especially preferred matrix resin formulation for use in the process of this invention comprises a resin based on novolac and cycloaliphatic epoxies, an anhydride viscosity builder, and a catalytic latent hardener, boron trichloride amine complex, and a surface-active agent selected from N-octyl pyrrolidinone, neopentyl(diallyl)oxytri(p-amino)-benzoato zirconate or a fluorinated alkyl ester surfactant.

Any suitable matrix resin capable of being formulated into a chemorheologically viscosity tailored matrix resin formulation may be employed in the process of this invention. Examples of such suitable curable matrix resins include, but are not limited to epoxy resins, bismaleimide resins, polyurethanes, polyesters and the like. The matrix material is preferably an epoxy resin and most preferably an epoxy resin formulation based on epoxy functional novolacs and cycloaliphatic. Further examples of suitable epoxy matrix resins include alicyclic diepoxide carboxylate resins such as Ciba-Geigy's CY-179 epoxy resin; diglycidyl ether bisphenol A epoxy resins such as Dow Chemical 332, DER 383 and DER 661 and Shell Chemical Co.'s EPON 826 and EPON 828; 1,4-butanediol diglycidylether such as Celanese Chemical Co.'s Epi-Rez 5022; polyglycol diepoxide resin such-as Dow Chemical Co.'s DER 732; a bisphenol F/epichlorohydrin epoxy resin such as Shell Chemical Co.'s DPL 862; an epichlorohydrin/tetraphenylol ethane epoxy resin such as Shell Chemical Co.'s EPON 1031 and mixtures thereof.

Similarly, any suitable fiber or filament material, including tapes and broad goods, in a form suitable for forming composite pressure vessels may be employed in the process of this invention. Examples of suitable fiber or filament materials include but are not limited to glass fibers, boron filaments, boron nitride, silicon carbide, graphite (carbon) filaments and high modulus organic filaments such as organic filaments of the polyethylene and aramid type.

Examples of high modulus organic filaments include, but are not limited to, poly(benzothiazoles) and poly(aromatic amides) which are commonly referred to simply as "aramids". Aramids include poly(benzamides) and family of aramid fibers sold by E. I. DuPont under the trademark KEVLAR®. KEVLAR® fibers show improved fiber stress performance in pressure vessels and generally allow a lower weight fraction of resin to be used compared to other fibers. As an example of carbon filaments useful in this invention, there may be mentioned, for example, Amoco Chemical Corp.'s T-40 and Toray's T-800H and T1000G carbon fibers. Carbon filaments are the preferred fiber or filament materials.

The matrix resin formulation employed in the process of this invention will contain sufficient surface-active agent to permit wetting of the reinforcing fiber or filament by a matrix resin but not too much so as to adversely interfere with the bond between the resin and fiber or filament. Generally, the surface-active agent will be present in the formulation in an amount of up to about 1% by weight, generally from about 0.01% to about 0.5% and preferably from about 0.05% to about 0.2% by weight based on the weight of the matrix resin formulation. Although it may be possible to include more surface-active agent than 1% by weight, any significantly greater amount may lead to an undesirable lessening or absence of bond strength.

Conventionally, when a fiber surface has been oxidized to obtain better bonding between fiber and matrix resin, translation of fiber strength to tensile strength of a pressure vessel has been found to decrease, i.e. the tensile strength of the hoop fibers is lowered compared to the tensile strength of the hoop fibers in a similarly prepared pressure vessel but where the fiber surface has not been oxidized. Lowering of the oxidized level of the fiber surface has produced lower bond strength between matrix resin and fiber and produced better pressure vessel strength. It has been shown that in highly oriented organic fibers such as DuPont's Kevlar 49 that release agents such as bow Corning's DC-20 applied to the filaments to prevent resin matrix bonding reduce shear strengths by an order of magnitude while increasing hoop tensile strength by about 25%. Thus, greater bond strength does not necessarily lead to greater pressure vessel tensile strength.

While the mode of action of the surface-active agents in the process of the present invention is not completely understood, it is believed that the surface-active agents contribute to the unexpected enhancement of fiber strength by producing fewer voids and a more even distribution of matrix resin within the fiber bundles thereby possibly reducing stress concentrations.

Any suitable surface-active agent or compound acting as a surface-active agent may be employed in the process of this invention, that is, surface-active agents, wetting agents, surfactant and coupling agents acting as surface-active agents may be employed. Any such agent or compound which promotes the wetting of a reinforcing fiber or filament by a matrix resin may suitably be employed.

Examples of such suitable surface-active agents or compounds acting as surface-active agents include but are not limited to N-octyl pyrrolidinone; FLUORAD® surfactant such as potassium fluoralkyl carboxylates, fluorinated alkyl polyoxyethylene ethanols and fluorinated alkyl ester surfactant from 3M; cationic quaternary ammonium chloride derivatives of polypropoxy tertiary amines sold by Witco Chemical Corp. under the Trademark EMCOL®, for example, EMCOL® CC36; a fatty imidazolene salt sold by Witco Chemical Corp. as Witcamine PA-78B; wetting agents such as alkylated silicone siloxane copolymer from Byk-Chemie and sold as BYK A-525 and BYX W-980; neoalkoxy zirconate and neoalkoxy titanate coupling agents such as Ken React LZ-37, Ken React LZ-97 and LICA 44 sold by Kenrich Petrochemicals, Inc.; a copolyacrylate wetting agent sold by Henkel Corporation as Perenol F-40; oleiamide of triand tetraethylene amines and an oleic acid salt of oleimide of N,N-dimethylpropyldiamine sold as Pave 192 by the Carstab division of Morton International, Inc.; decyl alcohol ethoxylate (~4 moles ethylene oxide) and decyl alcohol ethoxylate (~6 moles ethylene oxide) sold as DeTHOX DA-4 and DeTHOX DA-6, respectively by DeForest, Inc.; sodium dioctyl sulfosuccinate; nonylphenoxypoly(ethaneoxy) ethanol sold as Igepal CO-430 by GAF Corp., and the like. Especially preferred as surface-active agents for use in the process of this invention are N-octyl pyrrolidinone, neopentyl(diallyl)oxy tri(p-amino) benzoato zirconate (LZ-37), and fluorinated alkyl ester surfactant (FLUORAD® FC-430).

EXAMPLES

The following examples are given to illustrate various embodiments which have been made in accordance with the present invention. These examples are given by way of example only, and it is to be understood that the following examples are not comprehensive or exhaustive of the many types of embodiments of the present invention which can be prepared in accordance with the present invention.

Example 1

A 30 g portion of DY-9577 in a 2 liter beaker was heated at 40°–50° C. for 20 minutes to produce a liquid. To the liquid was added 600 g of CY-184, 84 g of nadic methyl anhydride, and 6 g of 2-ethyl-4-methylimidazole at room temperature with subsequent mixing. A prepreg tow was made using T-1000G carbon fiber (manufactured by Toray Industries) by the pressure-roller method with resin contents of 29.5 to 30.9 weight percent. After being stored at room temperature for 11 days, the prepreg tow was used to wind three 7.5-inch long, 5.75-inch diameter pressure vessels. Burst-testing of the three bottles showed that this formulation gave a tow strength translation of 80.6% and a coefficient of variation (C.V.) of 4.9%.

Example 2

A 30 g portion of DY-9577 was heated in a 2 liter beaker at 40°–50° C. for 20 minutes to produce a liquid. To the liquid was added 600 g of CY-184, 84 g of nadic methyl anhydride, 6 g of 2-ethyl-4-methylimidazole, and 1.44 g of LP-100 (1 -octyl-2-pyrrolidinone), a surfactant, with subsequent mixing. A prepreg tow was made using T-1000G carbon fiber by the pressure-roller method with resin contents of 28.9 to 29.8 weight percent. After being stored at room temperature for 8 days, the prepreg tow was used to wind three 7.5 inch long, 5.75-inch diameter pressure vessels. Burst-testing of the three bottles showed that this formulation gave a tow strength translation of 91.3% and a C.V. of 1.9% (compare to Example 1 with no surfactant).

Example 3

A 30 g portion of DY-9577 was heated in a 2 liter beaker at 40°–50° C. for 20 minutes to produce a liquid. To the liquid were added 600 g of CY-184 and a 140 g solution of 97% methyltetrahydrophthalic anhydride and 3% triphenylphosphine at room temperature with subsequent mixing. A prepreg tow was made using T-1000G carbon fiber by the pressure-roller method with resin contents of 26.9 to 33.5 weight percent. After being stored at room temperature for 12 days, the prepreg tow was used to wind three 7.5-inch long, 5.75-inch diameter pressure vessels. Burst-testing of the three bottles showed that this formulation gave a tow strength translation of 90.0% and a C.V. of 1.6%.

Example 4

A 30 g portion of DY-9577 was heated in a 2 liter beaker at 40°–50° C. for 20 minutes to produce a liquid. To the liquid were added 600 g of CY-184, 1.5 g of LP-100, and a 140 g solution of 97% methyltetrahydrophthalic anhydride and 3% triphenylphosphine at room temperature with subsequent mixing. A prepreg tow was made using T-1000G carbon fiber by the pressure-roller method with resin contents of 26.8 to 31.3 weight percent. After being stored at room temperature for 11 days, the prepreg tow was used to wind three 7.5-inch long, 5.75-inch diameter pressure vessels. Burst-testing of the three bottles showed that this formulation gave a tow strength translation of 92.9% and a C.V. of 1.5% (compare to Example 3 with no surfactant).

Example 5

A 38.5 g portion of DY-9577 was heated in a 2 liter beaker at 40°–50° C. for 20 minutes to produce a liquid. To the liquid were added 500 g of CY-184, 100 g of DEN-431, and a 140 g solution of 97% nadic methyl anhydride and 3% triphenyl phosphine at room temperature with subsequent mixing. A prepreg tow was made using T-1000G carbon fiber by the pressure-roller method with resin contents of 27.6 to 32.3 weight percent. After being stored at room temperature for 11 days, the prepreg tow was used to wind three 7.5-inch long, 5.75-inch diameter pressure vessels. Burst-testing of the three bottles showed that this formulation gave a tow strength translation of 83.8% and a C.V. of 3.4%.

Example 6

A 38.5 g portion of DY-9577 was heated in a 2 liter beaker at 40°–50° C. for 20 minutes to produce a liquid. To the liquid were added 500 g of CY-184, 100 g of DEN-431, 1.5 g of LP-100, and a 140 g solution of 97% nadic methyl anhydride and 3% triphenylphosphine at room temperature with subsequent mixing. A prepreg tow was made using T-1000G carbon fiber by the pressure-roller method with resin contents of 25.9 to 33.1 weight percent. After being stored at room temperature for 11 days, the prepreg tow was used to wind three 7.5-inch long, 5.75-inch diameter pressure vessels. Burst-testing of the three bottles showed that this formulation gave a tow strength translation of 88.3% and a C.V. of 0.7% (compare to Example 5 with no surfactant).

Table 1, below, sets forth the chemorheologically viscosity tailored matrix resin formulations of Examples 1–6.

TABLE 1

| Composition of Examples, parts by weight | | | | | | |
|---|---|---|---|---|---|---|
| | 1 | 2 | 3 | 4 | 5 | 6 |
| DY-9577 | 30 | 30 | 30 | 30 | 38.5 | 38.5 |
| DEN-431 | — | — | — | — | 100 | 100 |
| CY-184 | 600 | 600 | 600 | 600 | 500 | 500 |
| MTHPA | — | — | 136 | 136 | — | — |
| NMA | 84 | 84 | — | — | 136 | 136 |
| Ph₃P | — | — | 4 | 4 | 4 | 4 |
| 2,4-EMI | 6 | 6 | — | — | — | — |
| LP-100 | — | 1.44 | — | 1.5 | — | 1.5 |

DY-9577: boron trichloride-amine complex (Ciba-Geigy)
DEN-431: novolac epoxy (Dow Chemical)
CY-184: cycloaliphatic epoxy (Ciba-Geigy)
MTHPA: methyltetrahydrophthalic anhydride (Anhydride & Chem)
NMA: nadic methyl anhydride (Anhydride & Chem.)
Ph₃P: triphenylphosphine (Aldrich Chemicals)
2,4-EMI: 2-ethyl-4-methylimidazole (Air Products)
LP-100: 1-octyl-2-pyrrolidinone (GAF Corp.)

Table 2, below, compares hoop fiber performance of pressure vessels fabricated from prepregs described in Examples 1–6. The tow strength translation and coefficient of variation are given. In each of the three sets of resins the surfactant both increase the translation and reduced the variation.

TABLE 2

Tow Strength Translation and C.V. of Examples

| Example | Translation (%) | C.V. (%) |
|---|---|---|
| 1 | 80.6 | 4.9 |
| 2 | 91.3 | 1.9 |
| 3 | 90.9 | 1.6 |
| 4 | 92.9 | 1.5 |
| 5 | 83.8 | 3.4 |
| 6 | 88.3 | 0.7 |

SUMMARY

From the foregoing, it will be appreciated that the present invention provides methods and compositions for improving composite pressure vessel strength (as measured by higher translation and lower C.V.).

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for improving composite pressure vessel strength comprising:

(a) providing a chemorheologically viscosity tailored resin formulation comprising a curable matrix resin and an effective amount of a reactive curing agent reactive at room temperature and a latent curing agent substantially nonreactive at room temperature but activated upon heating or radiation, said reactive curing agent including at least one anhydride functional group;

(b) adding to said resin formulation an amount of surface-active agent sufficient to permit interaction between a fiber or filament and the resin formulation such that the pressure vessel tensile strength is enhanced and variation in performance is reduced;

(c) impregnating a fiber or filament strand or tow with the mixture of resin formulation and surface-active agent;

(d) allowing the reactive curing agent to partially cure the resin formulation and increase its viscosity, thereby forming a prepreg composition;

(e) winding a pressure vessel from said strand or tow prepreg composition; and (f) activating the latent curing agent to further cure the resin formulation and form a composite pressure vessel.

2. A method as defined in claim 1, wherein the surface-active agent is present in the matrix resin formulation in an amount up to about 1% by weight.

3. A method as defined in claim 1, wherein the surface-active agent is present in the matrix resin formulation in an amount of from about 0.01% to about 0.5% by weight.

4. A method as defined in claim 1, wherein the surface-active agent is present in the matrix resin formulation in an amount of from about 0.05% to about 0.2% by weight.

5. A method as defined in claim 1, wherein the fiber is a carbon fiber and the curable matrix resin is an epoxy resin.

6. A method as defined in claim 3, wherein the fiber is a carbon fiber and the matrix resin is an epoxy resin.

7. A method as defined in claim 1, wherein the surface-active agent is selected from the group consisting of N-octyl pyrrolidinone, a fluorinated alkyl ester surfactant, and a neoalkoxy zirconate coupling agent.

8. A method as defined in claim 3, wherein the surface-active agent is selected from the group consisting of N-octyl pyrrolidinone, a fluorinated alkyl ester surfactant, and a neoalkoxy zirconate coupling agent.

9. A method as defined in claim 5, wherein the surface-active agent is selected from the group consisting of N-octyl pyrrolidinone, a fluorinated alkyl ester surfactant, and a neoalkoxy zirconate coupling agent.

10. A method as defined in claim 6, wherein the surface-active agent is selected from the group consisting of N-octyl pyrrolidinone, a fluorinated alkyl ester surfactant and a neoalkoxy zirconate coupling agent.

11. A method as defined in claim 1, wherein the reactive curing agent viscosity builder is selected from the group consisting of aliphatic, cycloaliphatic, and aromatic anhydrides.

12. A method as defined in claim 1, wherein the reactive curing agent is selected from the group consisting of methyltetrahydrophthalic anhydride, nadic methyl anhydride, methylhexahydrophthalic anhydride, and maleic anhydride.

13. A method as defined in claim 1, wherein the latent resin curing agent is selected from the group consisting of a boron trifluoride complex, a boron trichloride complex, tertiary amines and their salts, and imidazoles dicyandiamide, and 2,4-toluene-1,1'-bis(3,3-dimethylurea).

14. A method as defined in claim 1, wherein the latent resin curing agent is a blocked Lewis acid epoxy curing agent.

* * * * *